United States Patent
Gharavy et al.

(10) Patent No.: US 9,436,662 B1
(45) Date of Patent: *Sep. 6, 2016

(54) METHOD AND APPARATUS FOR EXTENSIBILITY OF USER INTERFACE BINDING DEFINITIONS

(71) Applicant: Versata Development Group, Inc., Austin, TX (US)

(72) Inventors: Shari Gharavy, Austin, TX (US); Brian L. Blount, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,352

(22) Filed: Jan. 12, 2015

Related U.S. Application Data

(63) Continuation of application No. 13/457,285, filed on Apr. 26, 2012, now Pat. No. 8,943,481, which is a continuation of application No. 10/017,283, filed on Dec. 13, 2001, now Pat. No. 8,181,164, which is a continuation-in-part of application No. 09/896,140, filed on Jun. 29, 2001, now Pat. No. 7,269,788.

(51) Int. Cl.
G06F 9/45 (2006.01)
G06F 17/22 (2006.01)

(52) U.S. Cl.
CPC ............... *G06F 17/227* (2013.01); *G06F 8/51* (2013.01)

(58) Field of Classification Search
CPC .. G06F 17/2247; G06F 17/227; G06F 17/24; G06F 15/16; G06F 9/45
USPC ................ 717/136–144, 103, 167, 110–112; 709/207, 222, 238, 246; 715/501.1, 715/513, 523; 707/3, 10, 102
See application file for complete search history.

(56) References Cited

PUBLICATIONS

Notice of Allowance dated Jan. 11, 2012, mailed in U.S. Appl. No. 10/017,283, pp. 1-16.
Request for Continued Examination as filed in U.S. Appl. No. 10/017,283 on Dec. 16, 2011, pp. 1-16.
Terminal Disclaimer Review Decision dated Aug. 31, 2011, mailed in U.S. Appl. No. 10/017,283, p. 1.
Final Office Action dated Jun. 16, 2011, mailed in U.S. Appl. No. 10/017,283, pp. 1-13.
Response to Non-Final Office Action dated Oct. 21, 2010, in U.S. Appl. No. 10/017,283, filed Apr. 21, 2011, pp. 1-15.
Non-Final Office Action dated Oct. 21, 2010, mailed in U.S. Appl. No. 10/017,283, pp. 1-12.
Request for Continued Examination as filed in U.S. Appl. No. 10/017,283 on Sep. 10, 2010, pp. 1-22.

(Continued)

*Primary Examiner* — Tuan Vu

(57) ABSTRACT

Embodiments create a binding specifications file that is compatible with a user interface application from a grammar rich XML file. The grammar rich XML file uses a complex DTD for transformation. The complex DTD may be prone to error if created by the user, therefore, the complex DTD file is automatically created from a schema definition provided by the user or user's agent. The user or user's agent defines a schema for the desired grammar level. Through a series of XSL transformations, the complex DTD file is created. Also, a stylesheet used for transforming the grammar rich XML file is automatically created. The grammar rich XML file provided by the user conforms to the automatically created complex DTD file. Thus, the grammar used in defining bindings of a user interface application is extensible without any requirement to enrich and recompile the application anytime an extension of the language is desired.

31 Claims, 5 Drawing Sheets

(56) References Cited

PUBLICATIONS

Final Office Action dated Mar. 10, 2010 mailed in U.S. Appl. No. 10/017,283, pp. 1-22.
Response to Non-Final Office Action dated May 28, 2009, in U.S. Appl. No. 10/017,283, filed Nov. 30, 2009, pp. 1-16.
Non-Final Office Action dated May 28, 2009, mailed in U.S. Appl. No. 10/017,283, pp. 1-21.
Request for Continued Examination as filed in U.S. Appl. No. 10/017,283 Mar. 9, 2009, pp. 1-21.
Advisory Action dated Feb. 25, 2009, mailed in U.S. Appl. No. 10/017,283, pp. 1-3.
Response to Final Office Action dated Sep. 8, 2008, in U.S. Appl. No. 10/017,283, filed Feb. 9, 2009, pp. 1-18.
Final Office Action dated Sep. 8, 2008, mailed in U.S. Appl. No. 10/017,283, pp. 1-16.
Response to Non-Final Office Action dated Oct. 22, 2007, in U.S. Appl. No. 10/017,283, filed Apr. 22, 2008, pp. 1-14.
Non-Final Office Action dated Oct. 22, 2007, mailed in U.S. Appl. No. 10/017,283, pp. 1-19.
Request for Continued Examination as filed in U.S. Appl. No. 10/017,283 Sep. 26, 2007, pp. 1-18.
Final Office Action dated Mar. 26, 2007, mailed in U.S. Appl. No. 10/017,283, pp. 1-16.
Response to Non-Final Office Action dated Jul. 27, 2006, in U.S. Appl. No. 10/017,283, filed Jan. 12, 2007, pp. 1-14.
Non-Final Office Action dated Jul. 27, 2006, mailed in U.S. Appl. No. 10/017,283, pp. 1-16.
Request for Continued Examination as filed in U.S. Appl. No. 10/017,283 on Apr. 24, 2006, pp. 1-16.
Final Office Action dated Oct. 18, 2005, mailed in U.S. Appl. No. 10/017,283, pp. 1-18.
Response to Non-Final Office Action dated Jan. 14, 2005, in U.S. Appl. No. 10/017,283, filed Jul. 19, 2005, pp. 1-18.
Terminal Disclaimer Review Decision dated Jul. 19, 2005, mailed in U.S. Appl. No. 10/017,283, p. 1.
Non-Final Office Action dated Jan. 14, 2005, mailed in U.S. Appl. No. 10/017,283, pp. 1-23.
Notice of Allowance dated Sep. 17, 2014, mailed in U.S. Appl. No. 13/457,285, pp. 1-19.
Terminal Disclaimer Review Decision dated Aug. 26, 2014, mailed in U.S. Appl. No. 13/457,285, p. 1.
Response to Non-Final Office Action dated Feb. 25, 2014, in U.S. Appl. No. 13/457,285, filed Aug. 25, 2014, pp. 1-10.
Non-Final Office Action dated Feb. 25, 2014, mailed in U.S. Appl. No. 13/457,285. pp. 1-14.

Search Customer 400

401 Customer ID

403 Last Name

405 Last Name

407 Zip Code

409 Country

411 Organization

413 Phone #

Figure 4

METHOD AND APPARATUS FOR EXTENSIBILITY OF USER INTERFACE BINDING DEFINITIONS

This Application is a Continuation-In-Part of a U.S. application Ser. No. 09/896,140 filed on Jun. 29, 2001, entitled "EXTENSIBILITY AND USABILITY OF DOCUMENT AND DATA REPRESENTATION LANGUAGES," the specification of which is herein incorporated by reference.

FIELD OF THE INVENTION

This invention relates to the field of information and data processing technology. More specifically, the invention relates to extensibility of languages used for definition of user interface bindings.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF INVENTION

User interface binding is a process for mapping an object (e.g., a data object) to a user interface control. For example, assuming an object that represents a person or a customer, it may be desirable to display within a User Interface (UI) the first name, last name, middle name, address, phone number, and other necessary information for that customer or person. These UI display fields (or properties for a customer) are a set of controls that should always display the current information for each customer. Thus, the displays should always show the current information for the particular customer displayed. To achieve this, UI controls are generally bound to underlying data objects at time of coding so that there is no flexibility to customize bindings at run-time. Recent applications allow definition of bindings at run-time using complex and verbose input files defined in languages such as XML. These verbose input files generally require an expert programmer to create because the required format is very rigid.

Extensible Markup Language (XML) is a human-readable, machine-understandable, general syntax for describing data such as hierarchical data. XML is an open standard for describing data developed under the auspices of the World Wide Web Consortium (W3C). XML is a subset of the Standard Generalized Markup Language (SGML) defined in ISO standard 8879:1986. It is a formal language that can be used to pass information about the component parts of a document from one computer system to another. XML is in general a method for putting structured data in a text file. XML consists of a set of rules and guidelines for designing text formats for such data in a way that produces files that are easily read by, for example, a data processing system such as a computer. XML can be used to describe components of a document (e.g. form, address books, spread sheets, financial transactions, technical drawings, etc.), and it is based on the concept of documents composed of a series of elements, entities, and attributes. Elements describe the meaning of the text they describe. Entities are normally external objects, such as graphics files, that are intended to be included in a document. Entities can also be internal and can serve various other purposes such representing reserved characters and user defined purposes. XML also provides a formal syntax for describing the relationships between the elements, attributes, and entities that make up an XML document, such a syntax can be used to recognize component parts of each document as explained in more detail below.

To allow a computer to check the structure of an XML document, generally users associate the document with a document type definition (DTD). A DTD is a set of rules that explains how to use an XML document. The DTD declares each of the permitted elements and attributes, defines entities, and specifies the relationships between them. XML gains its extensibility by allowing users to define the elements, attributes, and entities. By defining the role and attributes of each element of text in a formal model, i.e., the Document Type Definition (DTD), users of XML can check the validity of each component of the document. An XML DTD allows computers to check, for example, that users do not accidentally enter a third-level heading without first having entered a second-level heading, something that cannot be checked using the HyperText Markup Language (HTML) used to code documents that form part of the World Wide Web (WWW) of documents accessible through the Internet. However, XML does not restrict users to using DTDs.

To use a set of elements that have, for example, been defined by a trade association or similar body, users need to know how the elements are delimited from normal text and in which order the various elements should be used. Systems that understand XML can provide users with lists of the elements that are valid at each point in the document and will automatically add the delimiters to the name to delineate the element. Where the data capture system does not understand XML, users can enter the XML elements manually for later validation. Elements and their attributes are entered between matched pairs of angle brackets (< . . . >) while entity references start with an ampersand and end with a semicolon (& . . . ;).

Because XML elements are based on the logical structure of the document they are somewhat easier to understand than physically based markup schemes of the type typically provided by word processors. As an example, a memorandum document coded in XML might look as follows:

```
<memo>
<to>All staff</to>
<from>R. Michael</from>
<date>April 1, 2001</date>
<subject>Bring Manuals</subject>
<text>Please bring your 'todo list with you to today's
meeting.</text>
</memo>
```

As shown in the example above, the start and end of each logical element of the file has been clearly identified by entry of a start-tag (e.g. <to>) and an end-tag (e.g. </to>). This formatting is ideal for a computer to follow, and therefore for data processing.

A DTD associated with the XML example above could take the form:

```
< !DOCTYPE memo [
< !ELEMENT memo       (to, from, date, subject?, para+)  >
< !ELEMENT para       (#PCDATA)  >
< !ELEMENT to         (#PCDATA)  >
< !ELEMENT from       (#PCDATA)  >
< !ELEMENT date       (#PCDATA)  >
```

```
< !ELEMENT subject      (#PCDATA) >
] >
```

This model indicates that a memorandum consists of a sequence of header elements, <to>, <from>, <date> and, optionally, <subject>, which must be followed by the contents of the memorandum. The content of the memo defined in this example consists of at least one paragraph (this is indicated by the + immediately after para). In this simplified example a paragraph has been defined as a leaf node of the memo element and can contain parsed character data (#PCDATA), i.e. data that has been checked to ensure that it contains no unrecognized markup strings (i.e. text).

XML-coded files are suitable for communicating data to be stored in databases. Because XML files are both object-oriented and hierarchical in nature they can be adapted to many types of databases. A standardized interface to XML data is defined through W3C's Document Object Model (DOM), which provides a Common Object Request Broker Architecture (CORBA) interface definition language (IDL) interface between applications exchanging XML data.

XML is said to be "well formed" when it complies with well-known XML rules. If a well-formed XML document is associated with and conforms to a DTD, the document is said to be "valid". XML validation and well formedness can be checked using XML processors which are commonly referred as XML parsers. An XML parser checks whether an XML document is valid by checking that all components are present, and the document instance conforms to the rules defined in the DTD.

Most applications have an engine known as an XML parser that accepts XML documents as input data. These XML documents must be well-formed to be accepted by the XML parser, and, if the documents are associated with a DTD, they must be valid. Additionally, XML uses a number of "reserved" characters such as "<" and ">". To use these characters as character data, they must be treated in accordance with specific XML rules. Otherwise, the XML parser will reject the XML document or possibly misinterpret it. Other languages have their own requirements for format and syntax. Some languages and parsers are more forgiving than others, but violation of such requirements generally causes an error either via rejection or misinterpretation. Therefore, the more data that a document contains (i.e. the more verbose the document), such as an XML document, the higher the likelihood that the document will contain errors. In the case of an XML document, the more data contained in a document the higher the likelihood that the document will not be well-formed and/or will be invalid. Thus, when an XML document is too verbose, it becomes prone to errors during parsing. To avoid the inclusion and recurrence of errors, in many instances experts are employed to write the XML document and associated DTD. Additionally, to accommodate a verbose XML document, the elements and attributes (i.e. grammar) supported by the parser would have to be large. One of the proposed advantages of XML is its extensibility. However, if extensions of an XML document's grammar were desired, the parser would have to be recompiled to support the extended grammar. Thus, the parser would have to be very complex to accommodate a large variety of elements and attributes. Therefore, there is a need to maintain a fixed or reduced complexity of the parser while allowing extensibility of the grammar available to XML document authors.

Extensible Stylesheet Language (XSL)

Extensible Stylesheet Language (XSL) is a language for creating a style sheet that describes how data sent to a user using the Extensible Markup Language is to be presented. XSL is based on, and extends the Document Style Semantics and Specification Language (DSSSL) and the Cascading Style Sheet, level 1 (CSS1) standards. XSL provides the tools to describe exactly which data fields in an XML file to display and exactly where and how to display them. XSL consists of two parts: a language for transforming XML documents and an XML vocabulary for specifying formatting semantics. For example, in an XML page that describes the characteristics of one or more products from a retailer, a set of open and close element s that designate products manufacturers might contain the name of the product manufacturer. Using XSL, it is possible to dictate to a web browser application on a computer the placement of the manufacturer's name on a page and the display style of the manufacturer's name.

Like any style sheet language, XSL can be used to create a style definition for one XML document or reused for many other XML documents.

Extensible Stylesheet Language Transformation (XSLT)

Extensible Stylesheet Language Transformation (XSLT) is a language for transforming XML documents into other XML documents. The specification of the syntax and semantics of XSLT is developed under the auspices of W3C.

XSLT is designed for use as part of XSL. XSL describes the styling of an XML document that uses formatting vocabulary of an application and uses XSLT to describe how the document is transformed into another XML document that uses the formatting vocabulary. However, XSLT is also designed to be used independently of XSL.

SUMMARY OF INVENTION

Some computer programs are designed to accept data in the form of a structured input file. The data contained within the structured input file may, for example, provide the computer program with a set of processing parameters. For example, the structured input file may direct the computer program to operate in accordance with certain preferences and/or use certain data. Prior art systems designed to accept such input require that the user know how to formulate the input in a certain way. An example of a language that may be used to formulate input data is referred to by those of ordinary skill in the art as the eXtensible Markup Language (hereinafter XML). As described in the background section of this document, XML is a human-readable, machine-understandable, general syntax for describing data such as hierarchical data.

An embodiment of the invention provides users with a simplified and extensible mechanism for creating structured input such as XML files for definitions of user interface binding properties. A computer program's input parser typically requires that the user create a verbose input file with redundant statements in some instances. In cases where the binding specifications must conform to a simplified Document Type Definition (hereinafter DTD), the XML files that are typically created can be overwhelmingly complex. This is particularly the case when the user is not intimately familiar with the specifics of XML. In such instances, the verbose input file is usually prone to errors if created by a novice user or an entity not involved in the initial creation of the application and parser. Thus, an embodiment of the invention allows the user to provide binding specifications in a preferred grammar level. This enables novice users and other users who are unfamiliar with the initial specifics of the program to create an input XML binding specification that can be used by the user interface application. This is accomplished in one embodiment of the invention by using a grammar rich XML file (simplified XML file) provided by the user.

The grammar rich XML file, i.e., one conforming to the vocabulary of the user generally requires a complex DTD for transformation. The complex DTD may also be prone to error if created by the user therefore, an embodiment of the present invention creates this complex DTD file automatically from a schema definition provided by the user or an agent of the user.

In an embodiment of the present invention, the user or an agent of the user defines a schema for the desired grammar level, and then through a series of XSL transformations, the complex DTD file is created. Also, a stylesheet used for transforming the user's grammar rich XML file is automatically created. The grammar rich XML file provided by the user conforms to the automatically created complex DTD file. Thus, the grammar used in defining the user interface bindings is extensible without any requirement to enrich and recompile the user interface application.

BRIEF DESCRIPTION OF DRAWINGS

FIG. 4 is an illustration of a User Interface object for a customer.

DETAILED DESCRIPTION

Embodiments of the invention provide users with a simplified yet extensible mechanism for providing User Interface binding information to a computer program. For example, embodiments of the invention enable users to define user interface bindings for an application in a way that reduces the complexity of providing data to application's document parser while allowing extensibility of the grammar available to the authors of the user interface definitions without necessitating the recompilation of a parser application. An extensible grammar provides a rich language from which the document authors can organize data. An extensible grammar also provides authors the capability to create new elements and attributes as desired. In the following description, numerous specific details are set forth in order to provide a more thorough understanding of embodiments of the invention. It will be apparent, however, to one skilled in the art, that the invention may be practiced without these specific details. In other instances, well-known features have not been described in detail in order to avoid unnecessarily obscuring the invention.

FIG. 4 is an illustration of a User Interface (UI) object for a customer, for example. The illustration shows several properties for a customer such as: Customer ID 401, Last Name 403, First Name 405, Zip Code 407, Country 409, Organization 411, and Phone #413. Generally, when a user enters a valid input into the Customer ID field 401, it is desirable to display the current available information for the other property fields. To achieve this, each property of a UI object is bound to an underlying object.

Figure 5:
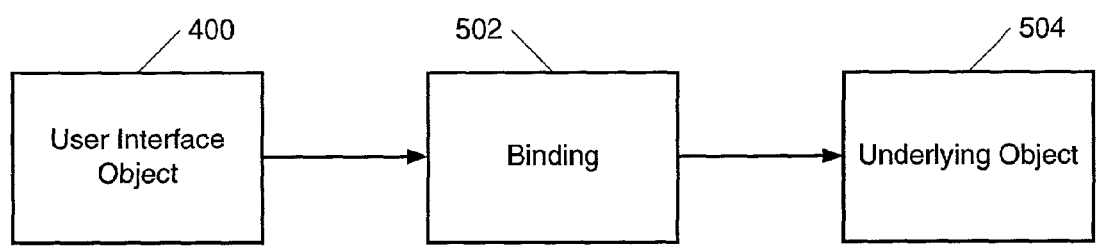
FIG. 5 is a schematic illustrating binding of user interface objects to data objects in accordance with an embodiment of the present invention.

FIG. 5 is a schematic illustrating binding of user interface objects to underlying objects. As illustrated, user interface object 400, having several properties (see FIG. 4), is bound to underlying object 504 via binding object 502. Underlying object 504 may be a database object, an object that performs some calculation, etc, for example. A binding is defined by two pieces of data: the class of the bound object and the set of bound properties. Binding object 502 may specify various rules for each bound UI property. For instance, the binding for a property may specify that a UI control that is editable use a drop-down menu (e.g., a customer's state of residence may require selection from a list in a drop-down menu) instead of freeform text field. This binding element may be referred to as the property editor. The binding may also include validation logic (or property validator) for the UI property. For example, a U.S. phone number field may only allow entry for seven or ten digits.

Also, each binding may contain an appropriate property locator. A property locator invokes an appropriate method to update the property either in the UI or in the underlying object. Thus, a property locator may be used to retrieve the specified property from the bound object. For instance, a property locator may invoke a get or set method (e.g., set-property name="xx"), or may calculate values that are displayed in the UI but not stored in the underlying database object. The property binding may also include information such as the binding name (e.g., firstName), display name (e.g., First Name), and the factory used to create the control that the application uses to edit the property.

In one or more embodiments, Binding 502 is represented as an XML document. The XML document contains the specification for each UI property and all the rules necessary for binding a UI property to its underlying object. Thus, the application that maintains the User Interface accepts an XML document as input for specification relating to each UI property.

Applications that use input documents to control execution of certain functions usually require that certain grammar, i.e., one supported by the application's input parser, be used in creating the input document. For example, assuming binding.inp listing below represent a verbose input file understood by the application's input parser. This application's input specifications require a possibly novice user to be able to specify items such as the appropriate property locators for the various UI properties being bound. Thus, it is desirable to have a much less verbose input definition that is easily understood by the user and then provide a mapping from the less verbose input specifications to the complex and verbose specifications understood by the application's input parser.

In the example shown below, objects for the property editor, validator, and locator are specified for the appropriate UI properties. This may be cumbersome and prone to errors for a novice programmer to implement.

Binding.inp

```
<? xml verSion="1.0" encoding="UTF-8"?>
<binding interface=". .\DefaultPartySearchCriteria">
    <property name="customerID" editable="yes">
        <editor>
            <object url="java:bindingdir.controladapter.
```

Binding.inp

```
ControlAdapterFactory">
        <set-property name="ClassName">
            <param type="java.lang.String">
                <constant
value="bindingdir.controladapter.NumericTextFieldAdapter"/>
            </param>
        </set-property>
    </object>
</editor>
</property>
<property name="lastName" editable="yes">
    <editor>
        <object url="java:bindingdir.controladapter.
ControlAdapterFactory">
            <set-property name="ClassName">
                <param type="java.lang.String">
                    <constant
value="bindingdir.controladapter.TextFieldAdapter"/>
                </param>
            </set-property>
            <set-property name="Columns">
                <param type="int">
                    <constant value="25"/>
                </param>
            </set-property>
        </object>
    </editor>
</property>
<property name="firstName" editable="yes">
    <editor>
        <object url="java:bindingdir.controladapter.
ControlAdapterFactory">
            <set-property name="ClassName">
                <param type="java.lang.String">
                    <constant
value="bindingdir.controladapter.TextFieldAdapter"/>
                </param>
            </set-property>
            <set-property name="Columns">
                <param type="int">
                    <constant value="25"/>
                </param>
            </set-property>
        </object>
    </editor>
</property>
<property name="zipCode" editable="yes">
    <editor>
        <object url="java:bindingdir.controladapter.
ControlAdapterFactory">
            <set-property name="ClassName">
                <param type="java.lang.String">
                    <constant
value="bindingdir.controladapter.ZipCodeTextFieldAdapter"/>
                </param>
            </set-property>
        </object>
    </editor>
    <validator>
        <object url="java:validator.ZipCodeValidator"/>
    </validator>
    <validation-error-handler>
        <object url="java:
crm.swingui.messagewriter.validationerrorhandler.Message
WriterValidationErrorHandler">
            <set-property name="MessageWriterName">
                <param type="java.lang.String">
                    <constant value="Dialog"/>
                </param>
            </set-property>
        </object>
    </validation-error-handler>
</property>
<property name="country" editable="yes">
    <editor>
        <object url="java:bindingdir.controladapter.
ControlAdapterFactory">
```

Binding.inp

```
            <set-property name="ClassName">
                <param type="java.lang.String">
                    <constant
value="bindingdir.controladapter.VDMComboBoxAdapter"/>
                </param>
            </set-property>
            <set-property name="VdmManager">
                <param type="java.lang.String">
                    <constant value="property:
crm.constants.VDMPropertyConstants$Local? COUNTRY"/>
                </param>
            </set-property>
            <set-property name="VdmName">
                <param type="java.lang.String">
                    <constant value="Country"/>
                </param>
            </set-property>
            <set-property name="IsInteger">
                <param type="boolean">
                    <constant value="false"/>
                </param>
            </set-property>
            <set-property name="AllowNull">
                <param type="boolean">
                    <constant value="true"/>
                </param>
            </set-property>
            <set-property name="UseDefault">
                <param type="boolean">
                    <constant value="false"/>
                </param>
            </set-property>
        </object>
    </editor>
</property>
<property name="organizationName" editable="yes"/>
<property name="phoneNumber" editable="yes">
    <editor>
        <object url="java:bindingdir.controladapter.
ControlAdapterFactory">
            <set-property name="ClassName">
                <param type="java.lang.String">
                    <constant
value="bindingdir.controladapter.PhoneNumberTextFieldAdapter"/>
                </param>
            </set-property>
        </object>
    </editor>
    <validator>
        <object url="java:validator.PhoneNumberValidator"/>
    </validator>
    <validation-error-handler>
        <object url="java:
crm.swingui.messagewriter.validationerrorhandler.Message
WriterValidationErrorHandler">
            <set-property name="MessageWriterName">
                <param type="java.lang.String">
                    <constant value="Dialog"/>
                </param>
            </set-property>
        </object>
    </validation-error-handler>
</property>
</binding>
```

An embodiment of the present invention reduces this complexity by providing extensibility in how the user may want to specify these properties. An embodiment of the invention allows creation of a simple and grammar rich XML file that achieves the same result (i.e., ultimate input file) by combining a complex and verbose DTD, which is automatically created through a series of transformations, with a simple XML file created by the user. A novice user of the application could more easily write the simple, but grammar rich (i.e., one that uses fewer words to describe the same tasks) XML input file. This approach is desirable because a novice user does not have the advanced familiarity with the application's input requirements and syntax that is required when the requirement is to create a complex and verbose input file with appropriate calls to the proper java objects. For instance, an XML input file written by one not intimately familiar with the grammar of an application's parser and interfaces may be prone to fatal errors. Therefore, an embodiment of the present invention provides the user the capability to define the inputs to the application using a grammar rich (i.e., simple and understandable) XML file while an appropriate DTD file (i.e., complex and verbose DTD file) is automatically created that is in conformance with the user's XML file.

Thus, for example, an application that uses graphical user interface (GUI) to provide a user access to the application's functions may provide the user the flexibility to customize the user interface properties and their bindings.

In an embodiment of the present invention, the mapping from a much less verbose XML to an input file format understood by the application's input parser is accomplished by first defining a schema for the more complex DTD. As used herein, a schema is a type of framework or plan for implementing a task, for example.

The schema is defined in an XML file conforming to a second DTD file, hereinafter called schema.dtd. An example schema.dtd is provided below. This XML file is then used to generate the complex DTD file (i.e., DTD with the rich grammar as desired by the user) and an XSL file. The generated XSL file is used to transform XML conforming to the complex DTD to an input file understood by the application's input parser.

Figure 1:
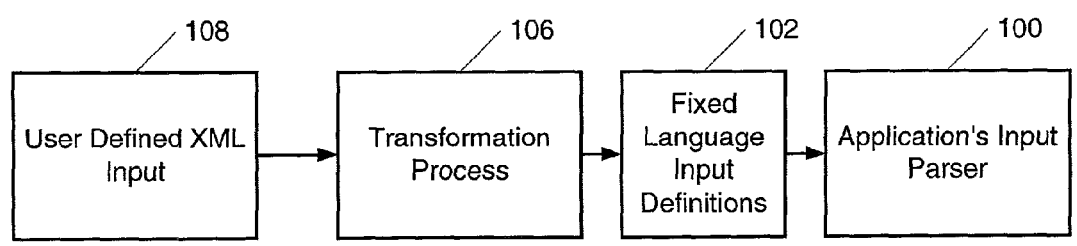
FIG. 1 is an illustration of the transformation process, in accordance with an embodiment of the present invention.

FIG. 1 is an illustration of the transformation process, in accordance with an embodiment of the present invention. The application's input parser 100 expects Fixed Language Input 102 to have a fixed format conforming to the design of the application. Parser 100 understands a fixed grammar and thus would complain about a fatal error and may stop processing when input (i.e., fixed language) 102 fails to comply with that fixed grammar. Thus regardless of the grammar used in user input 108, input 102 must comply with the grammar understood by input parser 100. Thus, if the grammar used in user defined input 108 is incompatible with the grammar of fixed language input 102, transformation may be necessary to make user defined input 108 conform with the grammar of fixed language input 102 in order to prevent application input parser 100 from encountering errors. Therefore, an embodiment of the present invention translates user input XML 108 using transformation processes defined at block 106 to generate fixed language input definitions 102. The grammar in XML input file 108 is not constrained by the application's input parser 100, thus it is extensible. That is, the grammar in XML input 108 need not be compatible with the grammar in fixed language input 102. XML input 108 could be in any grammar desired by the user and could be changed at will (i.e., extensible), while fixed language input 102 is fixed to the application and cannot be changed without recompiling the application. This means that a user organization is free to define its preferred format and language for user input XML file 108.

Figure 2:
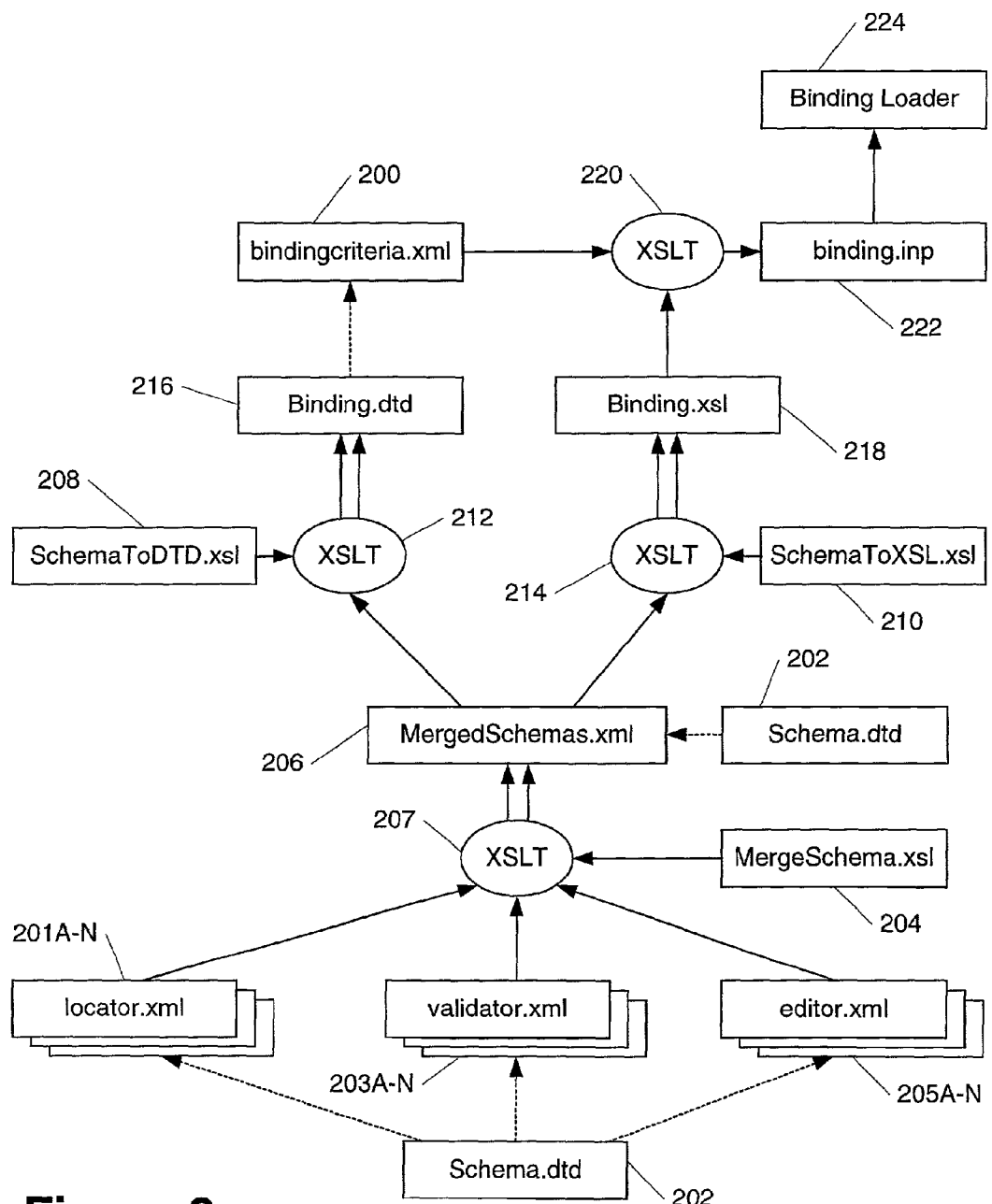
FIG. 2 is a detailed illustration of the transformation process in accordance with an embodiment of the present invention.

FIG. 2 is a detailed illustration of the transformation process in accordance with an embodiment of the present invention. The file names in the boxes correspond to sample files used herein to illustrate the transformation. Also, solid arrows indicate input, double arrows indicate automatically generated files, and dashed arrows represent the relationship between an XML file and its DTD. In one embodiment, in order to have an extensible rich language user input file such as bindingcriteria.xml 200, the document type definition file 216 (e.g., Binding.dtd) and stylesheet 218 (e.g., Binding.xsl) must be very complex and prone to error if written manually for every modification of the grammar. Thus, an embodiment of the present invention generates the document type definition file 216 (e.g., Binding.dtd) and stylesheet file 218 (e.g., Binding.xsl) automatically based on a schema defined for the grammar. The schema definition generally contains enough information that the application's input parser (e.g., Binding Loader 224) is able to construct the correct runtime representation of the object tree, regardless of the complexity of the rich grammar. Thus, an embodiment of the present invention creates an in-memory hierarchy of objects representing elements defined by the input file 222 (e.g., binding.inp). Generally, these elements may require implementors which are the fully qualified names of the java classes that implement the interfaces to the objects. For example, the DTD presented above specifies three main element types: property editor, property locator, and property validator, which may map to selected object interfaces.

Other embodiments of the invention may, for example, automatically generate machine independent codes (e.g., java codes) from the in-memory hierarchy of objects created after translation of the fixed input file 222 by Binding Loader 224. This may be accomplished, for example, by attaching an automatic code generation system to the application.

Generation of the fixed input file 222 (e.g., binding.inp) is accomplished by first defining a schema (also used interchangeably with "framework") for the more complex DTD file 216 (e.g., Binding.dtd). This schema is defined as one or more XML files conforming to the sample schema.dtd (e.g., 202) presented below. For example, XML files locator.xml 201A-N, validator.xml 203A-N, and editor.xml 205A-N define the grammar as desired by the user in conformance with schema.dtd 202. The one or more schema files (e.g., 201, 203, and 205) are merged and transformed by XSLT block 207 using stylesheet MergeSchema.xsl 204 to generate MergedSchemas.xml 206. Thus, MergedSchemas.xml 206 defines the schema for the desired complex DTD Binding.dtd 216. Notice that MergedSchemas.xml 206 also conforms to schema.dtd 202. In an embodiment, the user may use an agent, such as a consultant, to generate schema files 201, 203, and 205 for the desired grammar level.

---

Schema.dtd

```
<? xml version="1.0" encoding="UTF-8"?>
<!--
    This DTD (schema.dtd) defines the schema for the xml that defines
the schema of the rules that are used as input to the user interface
binding
    -->
<!ENTITY % schema-item"(editor|validator|locator|dtd-data|xsl-
data|include)">
<!ELEMENT schema ((%schema-item;)*)>
<!ELEMENT editor (attribute*)>
<!ATTLIST editor
    name CDATA #REQUIRED
    implementor CDATA #REQUIRED
    generate-xsl (true|false) "true"
>
<!ELEMENT locator (attribute*)>
<!ATTLIST locator
    name CDATA #REQUIRED
    implementor CDATA #REQUIRED
    generate-xsl (true|false) "true"
>
<!ELEMENT validator (attribute*)>
<!ATTLIST validator
    name CDATA #REQUIRED
```

-continued

```
Schema.dtd implementor CDATA #REQUIRED
    generate-xsl (true|false) "true"
>
<!ENTITY % value-definition"(constant-value-definition|function-value-
definition)">
<!ELEMENT constant-value-definition EMPTY>
<!ELEMENT function-value-definition EMPTY>
<!ATTLIST function-value-definition
    function CDATA #REQUIRED
>
<!ELEMENT attribute ((%value-definition;)?)>
<!ATTLIST attribute
    dtd-name CDATA #REQUIRED
    java-name CDATA #IMPLIED
    type CDATA "set-property"
    dtd-datatype CDATA "CDATA"
    java-datatype CDATA "java.lang.String"
    default CDATA "#IMPLIED"
>
<!ELEMENT dtd-data (#PCDATA)>
<!ELEMENT xsl-data (#PCDATA)>
<!ELEMENT include EMPTY>
<!ATTLIST include
    uri CDATA #REQUIRED
>
```

To provide the more complex DTD 216 for the defined schema, a stylesheet (e.g., SchemaToDTD.xsl 208) is provided and used by transformation engine XSLT 212 to automatically generate the complex DTD (e.g., Binding.dtd 216) from the combined schema (e.g., MergeSchemas.xml 206). Thus XSLT 212 creates an XML file which is the complex document type definition (DTD) needed for the grammar rich user input file bindingcriteria.xml 200. The invention also provides a stylesheet (e.g., SchemaToXSL.xsl 210) used by transformation engine XSLT 214 to create the stylesheet (e.g., Binding.xsl 218) for the grammar rich document (e.g., bindingcriteria.xml 200) provided by the user.

The grammar rich XML file (e.g., bindingcriteria.xml 200), typically defined by the application user, conforms to the automatically generated complex DTD (e.g., Bindings.dtd 216) because it is based on the user-defined schema. Finally, the transformation engine XSLT 220 transforms the user input XML file having rich grammar (e.g., bindingcriteria.xml 200) using the automatically generated stylesheet (e.g., Binding.xsl 218) to generate the fixed language input file (e.g., binding.inp 222) which conforms to the specification style and language understood by the applications input parser, Binding Loader 224. Thus, the generated fixed language XML file (e.g., binding.inp 222) is understood by the application's input parser 224 and should not result in fatal errors during processing.

An Example

The following is an example of the processes of an embodiment of the present invention where a user desires to ultimately create the fixed and verbose XML file presented above in binding.inp for a binding application.

It is assumed that the input file, binding.inp, may be too complicated for the novice user to create. Because, in order to define a useful user interface binding, the novice user must know which java objects to call for building particular user interface components or the locations of and which property locators perform certain binding function. Embodiments of the present invention remove the burden from the novice user by providing a method for the novice user to obtain a binding definition file that would deliver a user interface with the desired behavior but using a much richer language input source (e.g., a grammar rich XML file). In an embodiment, the user initially defines a schema for the desired grammar. As previously discussed, the schema may be created by an industry group, a consultant hired by the user, the Information Technology (IT) department of the user's corporation, etc. An example schema file is as follows:

```
<?xml version="1.0"encoding="UTF-8"?>
<!DOCTYPE schema SYSTEM"classpath:bindingdir/xml/Schema.dtd">
<schema>
    <editor name="check-box-editor"
        implementor="bindingdir.controladapter.ControlAdapterFactory">
        <attribute dtd-name="class-name"
            java-datatype="java.lang.String"
            default="bindingdir.controladapter.CheckBoxAdapter"/>
        <attribute dtd-name="text"
            java-datatype="java.lang.String"/>
    </editor>
</schema>
```

As shown, the schema contains references to the necessary implementor for the factory which creates the control used to edit the property. Implementors may be specified for property items such as editors, validators, and locators, which are generally of no interest and sometimes confusing to the novice user. Thus, embodiments of the present invention makes it easy for the user by requiring only definition of the simple XML file (i.e., bindingcriteria.xml) shown below instead of attempting to create the fixed XML file (e.g., binding.inp presented above) that is required by the application's input parser.

```
Bindingcriteria.xml

<?xml version="1.0" encoding="utf-8"?>
< !DOCTYPE binding SYSTEM"Binding.dtd">
<binding interface=". . \DefaultPartySearchCriteria">
    <property name="partyID">
        <editor>
            <text-field Columns="25" />
        </editor>
    </property>
    <property name="lastName">
        <editor>
            <text-field Columns="25" />
        </editor>
    </property>
    <property name="firstName">
        <editor>
            <text-field Columns="25" />
        </editor>
    </property>
    <property name="zipCode" />
    <property name="country">
        <editor>
            <vdm-combo-box vdm-manager=". .\CountryVDMProps"
                vdm-name="Country"
                is-integer="false" />
        </editor>
    </property>
    <property name="organizationName" />
    <property name="phoneNumber" />
</binding>
```

This format allows a user to specify all information about a binding in an XML file. Note that the control adapters, validators, and property locators (all of which are object parameters to the binding), are specified by dtd elements (for example, the text-field element). Within XML Transform framework, the set of control adapters, validators, and property locators is specified through schema files. Each schema file specifies information such as the dtd element name to be used by the XML files; the java class that corresponds to this element; and any parameters that can be set on the java class, for instance, in a text-field adapter, there is a property (e.g., columns) that can be set on the class through XML. Schema files may be provided for property locators, property validators, and property editors. The schema files are subsequently used to create the file binding.dtd. The entry in binding.dtd that corresponds to a text-field adapter may be as follows:

<!ELEMENT text-field EMPTY>
<!ATTLIST text-field columns CDATA #IMPLIED>

The schema files are also used to create an XSL Transform file (i.e., binding.xsl). This XSL transform is used to translate the simple XML specification of the binding (i.e., bindingcriteria.xml) into a much more verbose representation of the binding (i.e., binding.inp), which may then be used to load the binding information to the application.

Sample document type definitions and stylesheet listings for the transformation files of an embodiment of the present invention comprising MergeSchema.xsl; SchemaToXSL.xsl; and SchemaToDTD.xsl are included below. These listings provide documentation for the Extensibility of User Interface Bindings as described in this specification.

MergeSchema.xsl

```
<xsl:stylesheet
    version="1.0"
    xmlns:xsl="http://www.w3.org/1999/XSL/Transform"
>
    <xsl:output
        method="xml"
        indent="yes"
        doctype-system="Schema.dtd"
        cdata-section-elements="dtd-data xsl-data"
    />
    <xsl:template match="/">
        <schema>
            <xsl:apply-templates select="schema/*"/>
        </schema>
    </xsl:template>
    <xsl:template match="include">
        <xsl:apply-templates select="document(@uri)/schema/*"/>
    </xsl:template>
    <xsl:template match="@*|node( )">
        <xsl:copy>
            <xsl:apply-templates select="@*|node( )"/>
        </xsl:copy>
    </xsl:template>
</xsl:stylesheet>
```

SchemaToXSL.xsl

```
<xsl:stylesheet
    version="1.0"
    xmlns:xsl="http://www.w3.org/1999/XSL/Transform"
    xmlns:axsl="http://www.w3.org/1999/XSL/TransformAlias"
    xmlns:java="http://xml.apache.org/xslt/java"
    exclude-result-prefixes="java">
>
    <xsl:output
        method="xml"
        indent="yes"
    />
    <xsl:namespace-alias stylesheet-prefix="axsl" result-prefix="xsl"/>
    <xsl:template match="/">
        <axsl:stylesheet version="1.0">
            <axsl:output method="xml" indent="yes"/>
            <axsl:template match="binding">
                <binding interface="{{@interface}}">
                    <axsl:apply-templates/>
```

-continued

```
                </binding>
            </axsl:template>
            <axsl:template match="property">
                <property name="{{@name}}" editable="{{@editable}}">
                    <axsl:apply-templates/>
                </property>
            </axsl:template>
            <axsl:template match="editor">
                <editor>
                    <axsl:apply-templates/>
                </editor>
            </axsl:template>
            <axsl:template match="locator">
                <locator>
                    <axsl:apply-templates/>
                </locator>
            </axsl:template>
            <axsl:template match="validator">
                <validator>
                    <axsl:apply-templates/>
                </validator>
            </axsl:template>
            <xsl:apply-templates/>
        </axsl:stylesheet>
    </xsl:template>
    <xsl:template match="dtd-data|include"/>
    <xsl:template match="xsl-data">
        <xsl:for-each select="text( )">
            <xsl:value-of select="." disable-output-escaping="yes"/>
        </xsl:for-each>
    </xsl:template>
    <xsl:template match="editor|locator|validator">
        <xsl:if test="@generate-xsl='true'">
            <axsl:template match="{@name}">
                <axsl:element name="object">
                    <axsl:attribute name="url">java:<xsl:value-of select="@implementor"/>
                    </axsl:attribute>
                    <xsl:apply-templates select="attribute"/>
                    <axsl:apply-templates/>
                </axsl:element>
            </axsl:template>
        </xsl:if>
    </xsl:template>
    <xsl:template match="attribute">
        <xsl:choose>
            <xsl:when test="@default=#'IMPLIED'">
                <axsl:if test="@{@dtd-name}">
                    <xsl:call-template name="attribute-impl"/>
                </axsl:if>
            </xsl:when>
            <xsl:otherwise>
                <xsl:call-template name="attribute-impl"/>
            </xsl:otherwise>
        </xsl:choose>
    </xsl:template>
    <xsl:template name="attribute-impl">
        <axsl:element name="{@type}">
            <axsl:attribute name="name">
                <xsl:choose>
                    <xsl:when test="@java-name">
                        <xsl:value-of select="@java-name"/>
                    </xsl:when>
                    <xsl:otherwise>
                        <xsl:value-of select="string(./@dtd-name)"/>
                    </xsl:otherwise>
                </xsl:choose>
            </axsl:attribute>
            <param type="{@java-datatype}">
                <xsl:choose>
                    <xsl:when test="count(child::*) = 0">
                        <xsl:call-template name="constant-value-definition">
                            <xsl:with-param name="name" select="@dtd-name"/>
                        </xsl:call-template>
                    </xsl:when>
                    <xsl:otherwise>
                        <xsl:apply-templates>
                            <xsl:with-param name="name" select="@dtd-name"/>
                        </xsl:apply-templates>
```

-continued

```
                </xsl:otherwise>
            </xsl:choose>
        </param>
    </axsl:element>
</xsl:template>
<xsl:template match="attribute/constant-value-definition"
name="constant-value-definition">
    <constant value="{{@$name}}"/>
</xsl:template>
<xsl:template match="attribute/function-value-definition"
name="function-value-definition">
    <constant value="{@function}"/>
</xsl:template>
<xsl:template match="attribute/lookup-value-definition">
    <lookup enumeration="{@enumeration}" value="{{@$name}}"/>
</xsl:template>
</xsl:stylesheet>
```

SchemaToDTD.xsl

```
<xsl:stylesheet
    version="1.0"
    xmlns:xsl="http://www.w3.org/1999/XSL/Transform"
>
    <xsl:import href="format.xsl"/>
    <xsl:import href="dtd.xsl"/>
    <xsl:output
        method="text"
        indent="yes"
    />
    <xsl:key name="declarations" match="editor|locator|validator"
use="@name"/>
    <xsl:template match="schema" >
        <xsl:call-template name="dtd-comment"><xsl:with-param
name="comment">
            This document type definition definition describes the
structure of
            bindings for iMaint.
        </xsl:with-param></xsl:call-template>
        <xsl:call-template name="dtd-element">
            <xsl:with-param name="name">binding </xsl:with-param>
            <xsl:with-param name="elements"> (property*) </xsl:with-param>
        </xsl:call-template>
        <xsl:call-template name="dtd-attlist">
            <xsl:with-param name="name">binding </xsl:with-param>
            <xsl:with-param name="attributes">
                <xsl:call-template name="dtd-attribute">
                    <xsl:with-param name="name">interface </xsl:with-param>
                    <xsl:with-param name="datatype"> CDATA
</xsl:with-param>
                    <xsl:with-param name="default"> #REQUIRED
</xsl:with-param>
                </xsl:call-template>
            </xsl:with-param>
        </xsl:call-template>
        <xsl:call-template name="dtd-element">
            <xsl:with-param name="name"> property </xsl:with-param>
            <xsl:with-param name="elements"> (editor? , locator? , valida-
tor? )
            </xsl:with-param>
        </xsl:call-template>
        <xsl:call-template name="dtd-attlist">
            <xsl:with-param name="name"> property </xsl:with-param>
            <xsl:with-param name="attributes">
                <xsl:call-template name="dtd-attribute">
                    <xsl:with-param name="name"> name </xsl:with-param>
                    <xsl:with-param name="datatype"> CDATA
</xsl:with-param>
                    <xsl:with-param name="default"> #REQUIRED
</xsl:with-param>
                </xsl:call-template>
                <xsl:call-template name="dtd-attribute">
                    <xsl:with-param name="name"> editable </xsl:with-param>
                    <xsl:with-param name="datatype"> CDATA </xsl:with-param>
                    <xsl:with-param name="default"> "yes" </xsl:with-param>
```

SchemaToDTD.xsl

```
                </xsl:call-template>
            </xsl:with-param>
        </xsl:call-template>
        <xsl:call-template name="dtd-comment">
            <xsl:with-param name="comment"> editors </xsl:with-param>
        </xsl:call-template>
        <xsl:call-template name="list-entities">
            <xsl:with-param name="name"> editors </xsl:with-param>
            <xsl:with-param name="type" select="editor"/>
        </xsl:call-template>
        <xsl:call-template name="dtd-element">
            <xsl:with-param name="name">editor</xsl:with-param>
            <xsl:with-param name="elements">((%editors;)*)</xsl:with-param>
        </xsl:call-template>
        <xsl:apply-templates select="editor"/>
        <xsl:call-template name="dtd-comment">
            <xsl:with-param name="comment"> locators </xsl:with-param>
        </xsl:call-template>
        <xsl:call-template name="list-entities">
            <xsl:with-param name="name">locators </xsl:with-param>
            <xsl:with-param name="type" select="locator"/>
        </xsl:call-template>
        <xsl:call-template name="dtd-element">
            <xsl:with-param name="name">locator</xsl:with-param>
            <xsl:with-param name="elements">((%locators;)*)
        </xsl:with-param>
        </xsl:call-template>
        <xsl:apply-templates select="locator"/>
        <xsl:call-template name="dtd-comment">
            <xsl:with-param name="comment"> validators </xsl:with-param>
        </xsl:call-template>
        <xsl:call-template name="list-entities">
            <xsl:with-param name="name">validators </xsl:with-param>
            <xsl:with-param name="type" select="validator" />
        </xsl:call-template>
        <xsl:call-template name="dtd-element">
            <xsl:with-param name="name">validator</xsl:with-param>
            <xsl:with-param name="elements">((%validators;)*)
        </xsl:with-param>
        </xsl:call-template>
        <xsl:apply-templates select="validator"/>
        <xsl:call-template name="dtd-comment">
            <xsl:with-param name="comment"> dtd-data elements:
        </xsl:with-param>
        </xsl:call-template>
        <xsl:apply-templates select="dtd-data"/>
    </xsl:template>
    <xsl:template match="xsl-data"/>
    <xsl:template name="list-entities">
        <xsl:call-template name="dtd-entity">
            <xsl:with-param name="name">
                <xsl:value-of select="$name"/>
            </xsl:with-param>
            <xsl:with-param name="elements">
                <xsl:for-each select="$type">
                    <xsl:if test="position( )!=1">
                        <xsl:value-of select="$space"
/>|<xsl:value-of select="$space"/>
                    </xsl:if>
                    <xsl:value-of select="@name"/>
                </xsl:for-each>
            </xsl:with-param>
        </xsl:call-template>
    </xsl:template>
    <xsl:template match="editor|locator|validator">
        <xsl:if test="count(key('declarations', @name)) > 1">
            <xsl:message terminate="yes">
                <xsl:text>Duplicate name encountered-</xsl:text>
                <xsl:value-of select="@name"/>
            </xsl:message>
        </xsl:if>
        <xsl:call-template name="dtd-element">
            <xsl:with-param name="name">
                <xsl:value-of select="@name"/>
            </xsl:with-param>
            <xsl:with-param name="elements">
                EMPTY
```

-continued

```
SchemaToDTD.xsl
```

```
        </xsl:with-param>
      </xsl:call-template>
      <xsl:if test="count(child::*) > 0">
        <xsi:call-template name="dtd-attlist">
          <xsl:with-param name="name"><xsl:value-of select="@name"/></xsl:with-param>
          <xsl:with-param name="attributes">
            <xsl:for-each select="attribute">
              <xsl:call-template name="dtd-attribute">
                <xsl:with-param name="name">
                  <xsl:value-of select="@dtd-name"/>
                </xsl:with-param>
                <xsl:with-param name="datatype">
                  <xsl:value-of select="@dtd-datatype"/>
                </xsl:with-param>
                <xsl:with-param name="default">
                  <xsl:value-of select="@default"/>
                </xsl:with-param>
              </xsl:call-template>
              <xsl:if test="position( )!=last( )"><xsl:value-of select="$crlf"/></xsl:if>
            </xsl:for-each>
          </xsl:with-param>
        </xsl:call-template>
      </xsl:if>
    </xsl:template>
</xsl:stylesheet>
```

Embodiment of Computer Execution Environment (Hardware)

Figure 3:
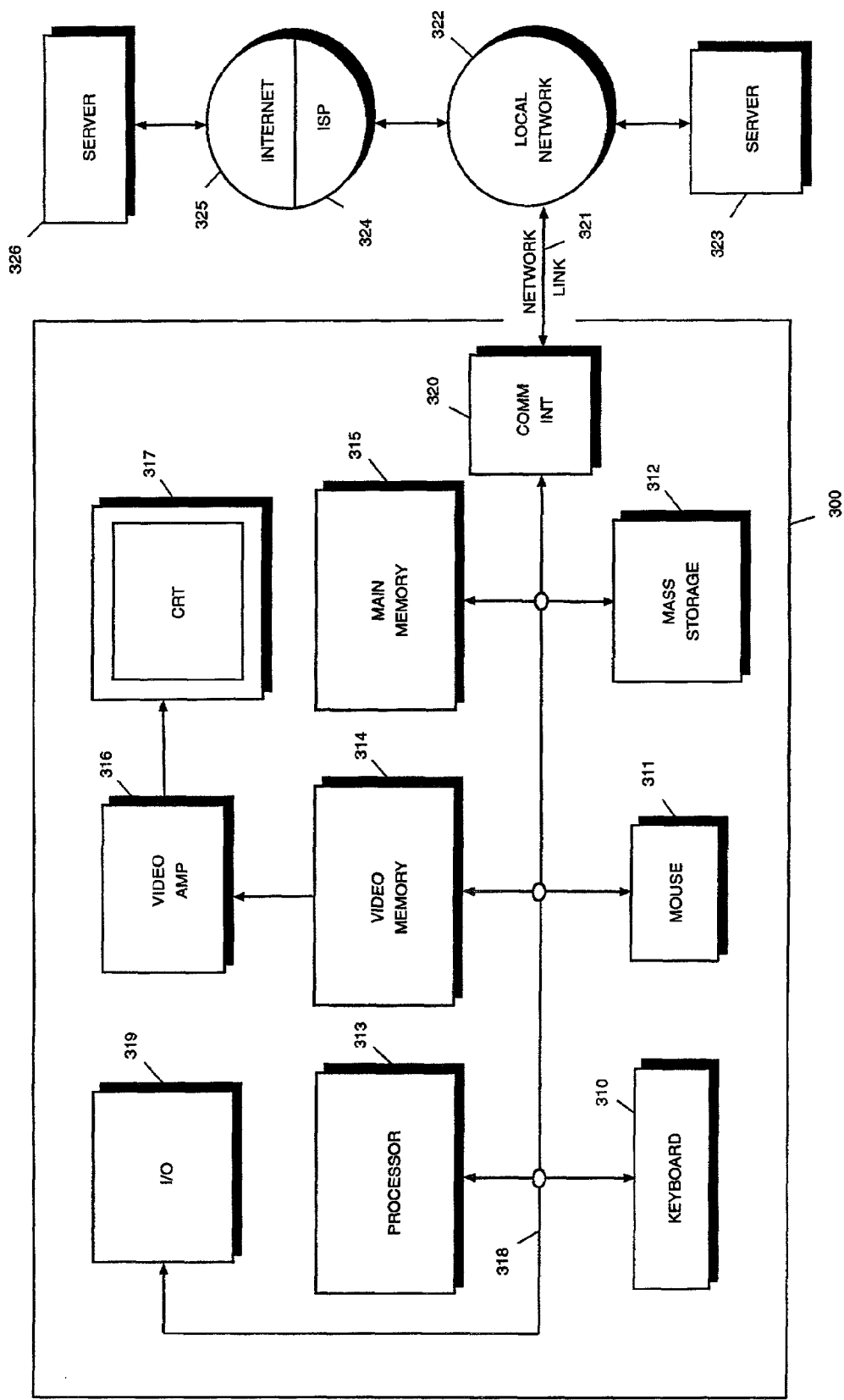
FIG. 3 is a block diagram of one embodiment of a computer system capable of providing a suitable execution environment for an embodiment of the invention.

An embodiment of the invention can be implemented as computer software in the form of computer readable code executed on any computer processing platform, or in the form of software (e.g., bytecode class files) that is executable within a runtime environment running on such a processing platform. An embodiment of the invention may be implemented in any type of computer system or programming or processing environment, including embedded devices (e.g., web phones, set-top boxes, etc.) and "thin" client processing environments (e.g., network computers (NC's), etc.). An example of a general computer system is illustrated in FIG. 3. The computer system described below is for purposes of example only.

In FIG. 3, keyboard 310 and mouse 311 are coupled to a system bus 318. The keyboard and mouse are for introducing user input to the computer system and communicating that user input to processor 313. Other suitable input devices may be used in addition to, or in place of, the mouse 311 and keyboard 310. I/O (input/output) unit 319 coupled to system bus 318 represents such I/O elements as a printer, A/V (audio/video) I/O, etc.

Computer 300 includes a video memory 314, main memory 315 and mass storage 312, all coupled to system bus 318 along with keyboard 310, mouse 311 and processor 313. The mass storage 312 may include both fixed and removable media, such as magnetic, optical or magnetic optical storage systems or any other available mass storage technology. Bus 318 may contain, for example, address lines for addressing video memory 314 or main memory 315. The system bus 318 also includes, for example, a data bus for transferring data between and among the components, such as processor 313, main memory 315, video memory 314 and mass storage 312. Alternatively, multiplexed data/address lines may be used instead of separate data and address lines.

In one embodiment of the invention, the processor 313 is a SPARC™ microprocessor from Sun Microsystems, Inc. or a microprocessor manufactured by Intel, such as the 80X86, or Pentium processor, or a microprocessor manufactured by Motorola, such as the 680X0 processor. However, any other suitable microprocessor or microcomputer may be utilized. Main memory 315 is comprised of dynamic random access memory (DRAM). Video memory 314 is a dual video random access memory. One port of the video memory 314 is coupled to video amplifier 316. The video amplifier 316 is used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images. Alternatively, the video memory could be used to drive a flat panel or liquid crystal display (LCD), or any other suitable data presentation device. Computer 300 may also include a communication interface 320 coupled to bus 318. Communication interface 320 provides a two-way data communication coupling via a network link 321 to a local network 322. For example, if communication interface 320 is an integrated services digital network (ISDN) card or a modem, communication interface 320 provides a data communication connection to the corresponding type of telephone line, which comprises part of network link 321. If communication interface 320 is a local area network (LAN) card, communication interface 320 provides a data communication connection via network link 321 to a compatible LAN. Communication interface 320 could also be a cable modem or wireless interface. In any such implementation, communication interface 320 sends and receives electrical, electromagnetic or optical signals which carry digital data streams representing various types of information.

Network link 321 typically provides data communication through one or more networks to other data devices. For example, network link 321 may provide a connection through local network 322 to local server computer 323 or to data equipment operated by an Internet Service Provider (ISP) 324. ISP 324 in turn provides data communication services through the world wide packet data communication network now commonly referred to as the "Internet" 325. Local network 322 and Internet 325 both use electrical, electromagnetic or optical signals which carry digital data streams. The signals through the various networks and the signals on network link 321 and through communication interface 320, which carry the digital data to and from computer 300, are exemplary forms of carrier waves transporting the information.

Computer 300 can send messages and receive data, including program code, through the network(s), network link 321, and communication interface 320. In the Internet example, remote server computer 326 might transmit a requested code for an application program through Internet 325, ISP 324, local network 322 and communication interface 320.

The received code may be executed by processor 313 as it is received, and/or stored in mass storage 312, or other non-volatile storage for later execution. In this manner, computer 300 may obtain application code in the form of a carrier wave. Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Thus, a method and apparatus for providing extensible definition of bindings using XML for applications with limited grammar have been described in conjunction with one or more specific embodiments. The invention is defined by the claims and their full scope of equivalents.

What is claimed is:

1. A method for extensibility of binding definitions for an application comprising:
   executing a program by a computer system that transforms the computer system into a machine that performs:
      obtaining a framework having definitions of a first set of rules for a first grammar level used for interpretation of binding specifications to bind a user interface object to an underlying object, wherein the application is incompatible with the first grammar level;
      performing a first transformation of the framework to generate the first set of rules for interpretation of the binding specifications in the first grammar level;
      performing a second transformation of the framework to generate a first presentation style for the first grammar level;
      obtaining the binding specifications in the first grammar level, the binding specification conforming to the first set of rules; and
      applying the first set of rules and the first presentation style to the binding specification to generate output binding specifications in a second grammar level compatible with the application.

2. The method of claim 1, wherein the obtaining a framework comprises:
   obtaining at least one file having contents comprising grammar definitions conforming to a second set of rules; and
   transforming the contents of the at least one file into the framework using a second presentation style conforming to the framework.

3. The method of claim 1, wherein the first transformation is in accordance with a third presentation style.

4. The method of claim 1, wherein the second transformation is in accordance with a fourth presentation style.

5. The method of claim 1, wherein the first grammar level of the binding specifications is extensible.

6. The method of claim 1, wherein the second grammar level compatible with the application is fixed.

7. The method of claim 1, wherein the binding specifications are defined by a user in extensible markup language (XML).

8. The method of claim 1, further comprising:
   performing, by the programmed computer system:
      passing the output binding specifications as input to the application.

9. A non-transitory, computer readable medium that includes code stored therein and executable by one or more data processors to configure a computer system into a machine for generating a computer readable document utilized for input into an application by:
   obtaining a framework having definitions of a first set of rules for a first grammar level used for interpretation of binding specifications to bind a user interface object to an underlying object, wherein the application is incompatible with the first grammar level;
   performing a first transformation of the framework to generate the first set of rules for interpretation of the binding specifications in the first grammar level;
   performing a second transformation of the framework to generate a first presentation style for the first grammar level;
   obtaining the binding specifications in the first grammar level, the binding specification conforming to the first set of rules; and
   applying the first set of rules and the first presentation style to the binding specification to generate the computer readable document having the output binding specifications in a second grammar level compatible with the application.

10. The computer readable medium of claim 9, wherein the obtaining a framework comprises:
    obtaining at least one file having contents comprising grammar definitions conforming to a second set of rules; and
    transforming the contents of the at least one file into the framework using a second presentation style conforming to the framework.

11. The computer readable medium of claim 9, wherein the first transformation is in accordance with a third presentation style.

12. The computer readable medium of claim 9, wherein the second transformation is in accordance with a fourth presentation style.

13. The computer readable medium of claim 9, wherein the first grammar level of the binding specifications is extensible.

14. The computer readable medium of claim 9, wherein the second grammar level compatible with the application is fixed.

15. The computer readable medium of claim 9, wherein the binding specifications are user defined in extensible markup language (XML).

16. An apparatus comprising:
    one or more data processors; and
    a memory, coupled to the processor that includes code stored therein and executable by the one or more first data processors to configure a computer system into a machine for generating a computer readable document utilized for input into an application by:
       obtain a framework having definitions of a first set of rules for a first grammar level used for interpretation of binding specifications to bind a user interface object to an underlying object, wherein the application is incompatible with the first grammar level;
       perform a first transformation of the framework to generate the first set of rules for interpretation of the binding specifications in the first grammar level;
       perform a second transformation of the framework to generate a first presentation style for the first grammar level;
       obtain the binding specifications in the first grammar level, the binding specification conforming to the first set of rules; and
       apply the first set of rules and the first presentation style to the binding specification to generate the computer readable document having the output binding specifications in a second grammar level compatible with the application.

17. The apparatus of claim 16, wherein to obtain a framework comprises:
    obtaining at least one file having contents comprising grammar definitions conforming to a second set of rules; and
    transforming the contents of the at least one file into the framework using a second presentation style conforming to the framework.

18. The computer readable medium of claim 16, wherein the first transformation is in accordance with a third presentation style.

19. The computer readable medium of claim 16, wherein the second transformation is in accordance with a fourth presentation style.

20. The computer readable medium of claim 16, wherein the first grammar level of the binding specifications is extensible.

21. The computer readable medium of claim 16, wherein the second grammar level compatible with the application is fixed.

22. The computer readable medium of claim 16, wherein the binding specifications are user defined in extensible markup language (XML).

23. The computer readable medium of claim 16, further comprising computer program code configured to cause the computer system to:

pass the output binding specifications as input to the application.

24. An apparatus for simplifying binding specifications provided to a computer program and generating a computer readable document utilized for input into an application, the apparatus comprising:

means for obtaining a framework having definitions of a first set of rules for a first grammar level used for interpretation of binding specifications to bind a user interface object to an underlying object, wherein the application is incompatible with the first grammar level;

means for performing a first transformation of the schema to generate the first set of rules for interpretation of the binding specifications in the first grammar level;

means for performing a second transformation of the framework to generate a first presentation style for the first grammar level;

means for obtaining binding specifications in the first grammar level, the binding specification conforming to the first set of rules; and means for applying the first set of rules and the first presentation style to the binding specification to generate the computer readable document having the output binding specifications in a second grammar level compatible with the application.

25. The apparatus of claim 24, wherein the means for obtaining a framework comprises:

means for obtaining at least one file having contents comprising grammar definitions conforming to a second set of rules; and means for transforming the contents of the at least one file into the schema using a second presentation style conforming to the schema.

26. The apparatus of claim 24, wherein the first transformation is in accordance with a third presentation style.

27. The apparatus of claim 24, wherein the second transformation is in accordance with a fourth presentation style.

28. The apparatus of claim 24, wherein the first grammar level of the binding specifications is extensible.

29. The apparatus of claim 24, wherein the second grammar level compatible with the application is fixed.

30. The apparatus of claim 24, wherein the binding specifications are user defined in extensible markup language (XML).

31. The apparatus of claim 24, further comprising:

means for passing the output binding specifications as input to the application.

\* \* \* \* \*